INVENTORS M. B. GARDNER
J. R. NELSON
BY G. E. Hirsch Jr.
ATTORNEY

INVENTORS M. B. GARDNER
J. R. NELSON
BY G. E. Hirsch
ATTORNEY

United States Patent Office 3,145,269
Patented Aug. 18, 1964

3,145,269
CONTROL OF DYNAMIC RANGE AND SENSITIVITY OF ECHO SUPPRESSOR CIRCUITS

Mark B. Gardner, Chatham Township, Morris County, and John R. Nelson, Somerville, N.J., assignors to Bell Telephone Laboratories, Incorporated, New York, N.Y., a corporation of New York Filed May 16, 1962, Ser. No. 195,159
7 Claims. (Cl. 179—170.6)

This invention relates to signal wave transmission systems and particularly to signal-controlled means for suppressing echoes in such systems.

In two-way telephone circuits it is common practice to interconnect local two-wire circuits, such as subscriber lines, by way of four-wire facilities which consist of two, unidirectional, two-wire circuits. At each two-wire to four-wire junction an arrangement known as a hybrid directs the outgoing signals over one channel and accepts incoming signals from the other. In a long distance circuit with appreciable transmission time delay, the transition from the two unidirectional paths to one bidirectional path normally gives rise to echoes or reflected transmissions. It is the usual practice to minimize such echo transmissions by means of signal-controlled apparatus which effectively disables one of the unidirectional paths while signal transmission is taking place over the other. Thus, echo signals are prevented from being transmitted back to the originating end and causing either a disturbance or singing. The disabling apparatus usually comprises means, such as an amplifier-detector control circuit, for diverting a portion of the signal from one path and utilizing it to control the open circuiting or short circuiting of the oppositely directed path, or to control the operational characteristics of an amplifier or attenuator in the oppositely directed path.

Ordinarily, as the suppressor element in one path is actuated to prevent echo return, reply by the other subscriber tends to be locked out. In a differentially controlled, variable loss echo suppressor, this situation is somewhat improved. Here, the amount of attenuation introduced in the return path is dependent on the magnitude of the speech signals present both at the transmit and the receive side of the terminal hybrid. With apparatus of this sort it is theoretically possible for either party to break into the conversation, i.e., to remove partially or fully the block in the transmission path, merely by raising the voice. However, since suppressor action is normally employed at both terminals, the removal of suppression at one end results in an increase in suppression at the other. There is thus a tendency for one subscriber to obtain more or less dominant control during periods of double talking. This is particularly objectionable for the combination of a weak and strong voiced subscriber. Since normal speech is characterized by continuous fluctuations in the levels of the individual speech sounds, even a weak talker produces levels which momentarily are well above the low level speech sounds of the loud talker. The net result is that both talkers tend to interfere to a greater or lesser degree with normal transmission by the other during periods of double talking or attempted break-in.

Moreover, noise present in either the incoming or the outgoing circuits, or both, tends to mask the weak talker's signals so that the difficulties of breaking in are further compounded. If suppression action is completely removed in the presence of appreciable noise, break-in is facilitated but echoes are, of course, passed and objectionable switching transients may be produced.

It is, accordingly, a principal object of the present invention to improve the operation of a long two-way signaling system employing signal-controlled apparatus for suppressing echoes.

It is a further object of the invention to increase the ease of break-in in a two-way signaling system equipped with echo suppressors.

It is still another object of the invention to improve the operation of a two-way signaling system employing echo suppressor apparatus by retaining apparent full volume transmission in each direction both in single talking and double talking situations and, insofar as desirable, in periods of high circuit or background noise.

These and other objects are attained in accordance with the present invention by continuously adjusting the dynamic range of the echo suppressor elements as the ratio of incoming to outgoing speech changes, and by simultaneously and continuously altering the sensitivity of the suppressor as a function of noise. For the condition in which incoming signals only are present (a single talking situation) suppression is introduced in the outgoing path, and the degree of attenuation is continuously adjusted in response to the magnitude of the incoming signal. Signals subsequently developed in the outgoing path by the local subscriber (a double talking situation), are distinguished from echoes and suppressor action is immediately softened in favor of the local subscriber by restricting the attenuation versus control level characteristic of the suppressor. Incoming signals still control the degree of attenuation in the outgoing line, but are effective to do so only over a restricted dynamic range. Extremely low level signals are given a further advantage in the presence of noise by desensitizing the suppressor to noise, but leaving it essentially operative on speech signals. As a result of the simultaneous manipulation of the attenuation characteristic both by speech signals present on the incoming and outgoing lines and by noise, near optimum suppression is achieved over an extremely broad range of bidirectional and transmission noise situations.

Thus, one important embodiment of the invention takes the form of an echo suppressor which includes provision for reducing the dynamic attenuation range of the suppressor elements during periods of double talking but, at the same time, retaining the variable loss action of the suppressor. Ordinary differential control of a multiple element loss device is supplemented by independent time-logic control of the over-all attenuation range of each loss device, and by independent noise control of a restricted range of each loss device.

The invention will be fully apprehended from the following detailed description of an illustrative embodiment thereof taken in connection with the appended drawings, in which.

In the interests of simplicity, the circuit diagrams to be discussed are presented, for the most part, in block schematic form, with single-line paths which direct the flow of energy and information to the several apparatus components which process it. This rule is departed from in a few individual instances where the inclusion of electric input terminals and output terminals appears to add to the clarity of exposition. It is to be understood that, in practice, each single-line energy path will normally be actualized with two electric conductors, one of which may in many cases be connected to ground.

Figure 1:
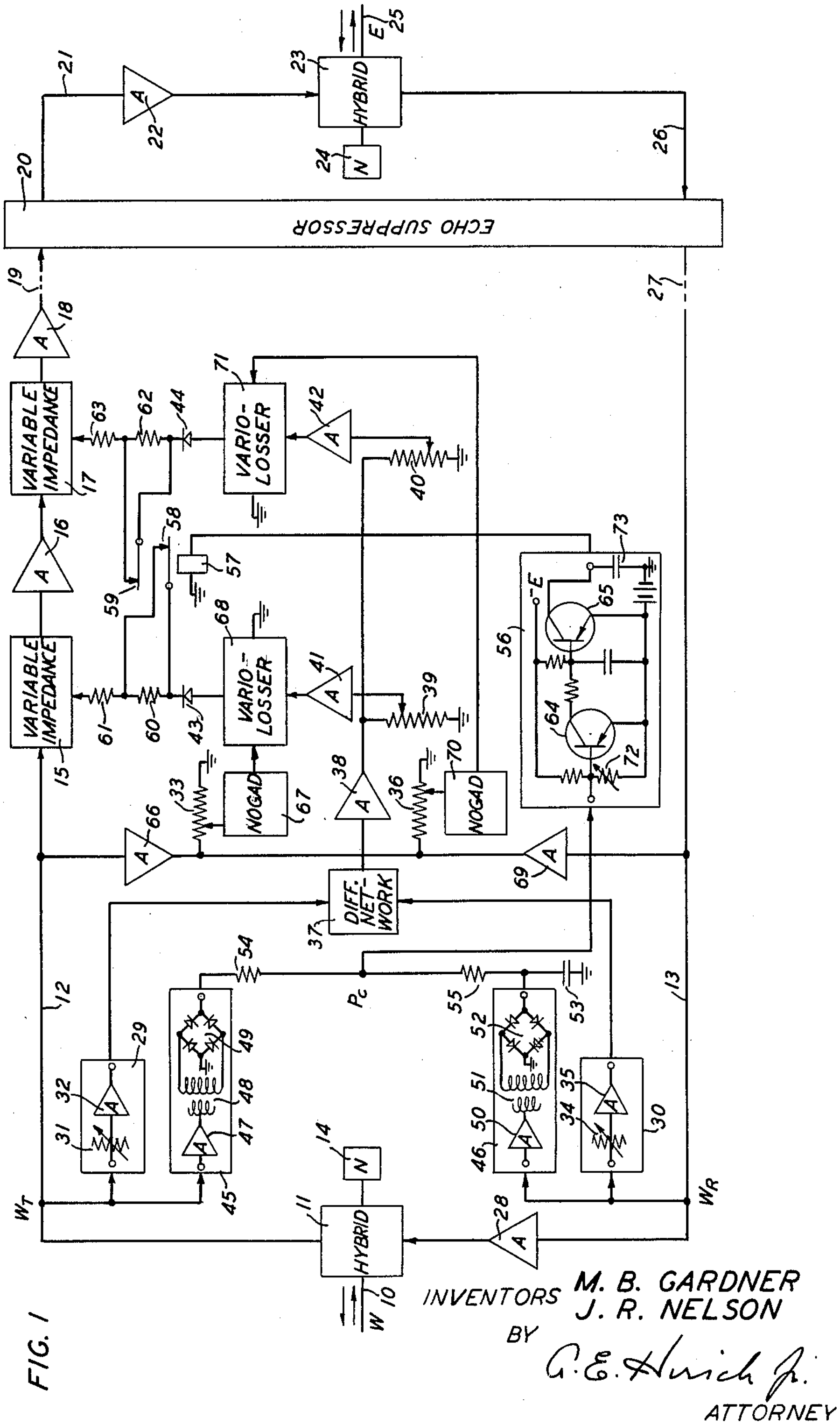
FIG. 1 is a block schematic diagram showing a two-way signal transmission system constructed in accordance with the principles of the present invention.

FIG. 1 illustrates, by way of a simplified block diagram, a signal transmission system interconnecting two terminal stations designated respectively E (East) and W (West). Two-way transmission is carried out in the following manner. A local circuit 10, which typically is a conventional two-wire telephone circuit connecting a subscriber to station W, is connected by hybrid network 11 to one end of a four-wire system that includes two separate two-wire circuits 12 and 13. In well known fashion, the hybrid network provides a one-way path for voice currents from circuit 10 to outgoing circuit 12 and another one-way path for incoming currents from circuit 13 to local circuit 10. The impedance of the local circuit 10 is matched insofar as practical by a balancing network 14 associated with hybrid 11.

Outgoing currents in circuit 12 are passed by way of a variable impedance 15, amplifier 16, variable impedance 17, and amplifier 18 to the West-to-East transmission circuit 19, which may be of any desired sort. In the typical long distance circuit case, the transmission circuit represents appreciable time delay. At the East station, currents from circuit 19 are delivered to echo suppressor apparatus 20 and then by way of circuit 21 and isolating amplifier 22 to hybrid network 23. Suppressor apparatus 20 is generally identical to that utilized at station W, which is illustrated in detail and which will be described presently, but it may, of course, be of any desired sort. Hybrid 23, terminated by network 24, transfers incoming signal currents from circuit 21 to subscriber circuit 25 and routes locally generated signals from circuit 25 to outgoing circuit 26. Output currents are passed by way of suppressor apparatus 20 to East-to-West circuit 27 and eventually to station W. Signal currents received at station W are delivered to various elements of the associated echo suppressor apparatus and then by way of circuit 13 and receive amplifier 28 to hybrid 11.

Ideally, all incoming currents at station W are passed to the subscriber line 10; none is transferred to the outgoing circuit 12. Unfortunately, in actual practice, the balancing network, e.g., 14, provides only a partial match to line 10 and a portion of the incoming wave reaches line 12. In the absence of suppression, this portion is returned to the remote station as echo. In addition, echo componets arise at any and all circuit discontinuities on line 10. These components are also reflected back to reach line 12 in a similar way. Depending on its magnitude and on the amount of delay (round trip transmission time), the resulting echo may be of considerable annoyance to the talking subscriber. Also, echo currents tend to circulate repeatedly around the loop and, if of sufficient magnitude, cause still further annoyance to both subscribers. Accordingly, echo suppressor apparatus is included in the transmission system.

In the system illustrated in FIG. 1, it includes a multi-element loss circuit comprising serially connected variable impedance 15, isolating amplifier 16, variable impedance 17 and amplifier 18. Variable impedances 15 and 17 may be variable gain amplifiers or switching elements designed effectively to open or short circuit the signal path to any desired degree in response to external stimulus. Preferably, variolossers, of any desired construction, which possess a nonlinear suppression characteristic are employed. By using two or more lossers in tandem, a suppression characteristic may be obtained that provides fairly slow suppression action at low levels, and somewhat faster action at higher levels. Amplifiers 16 and 18 serve primarily to compensate for any insertion losses, and effectively to isolate the several units from each other. With the provision of independent control of each of the nonlinear impedance elements, e.g., variolossers, a wide variety of composite attenuation characteristics are made available. It is in accordance with the present invention to adjust continuously and automatically the individual characteristics of the variolossers as required so that the over-all transfer function of the loss elements in the outgoing circuit is at every moment tailored to the circuit requirements.

Primary control of the impedance of variolossers 15 and 17 is provided by a differential network which includes detector 29 responsive to signals developed in outgoing circuit 12 (at point $W_T$) and detector 30 connected in and responsive to signals present in input circuit 13 (point $W_R$). Typically, the detector elements include the series combination of a line attenuator, an amplifier, and, if desired, a rectifier. Thus, detector 29 employs elements 31 and 32, and detector 30 employs corresponding elements 34 and 35. Signals developed by the detectors, are compared in differential network 37 and, in dependence on the resultant of the comparison, a control signal is passed by way of amplifier 38 to variolosser suppressor elements 15 and 17. Preferably, potentiometers 39 and 40 are utilized to provide manual adjustment for establishing the basic suppressor characteristic and range. Additional elements in the control circuit of the variolossers, whose functions will be described below, include isolation amplifier 41, variolosser 68, rectifier 43 and resistors 60 and 61 in the circuit of losser 15, and isolation amplifier 42, variolosser 71, rectifier 44, and resistors 62 and 63 in the circuit of losser 17.

Before considering the function of the additional elements utilized in controlling the transfer function of the loss devices, it is well to consider in detail the attenuation characteristics of the elements individually and in tandem combination shown, and the variations that may be made in them.

Figure 2:
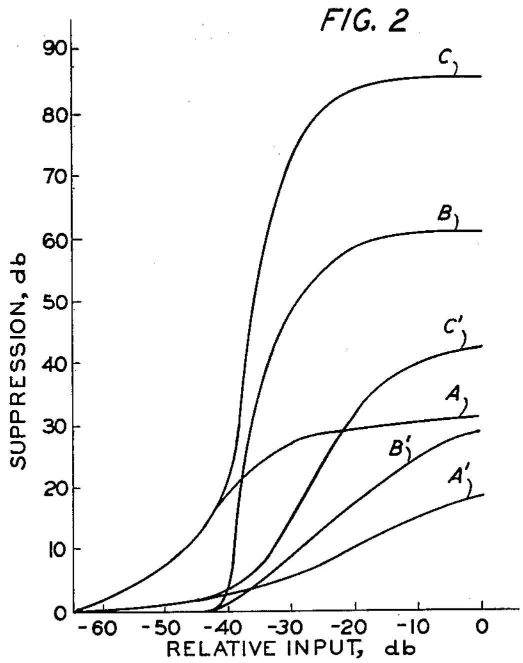
FIG. 2 is a set of curves illustrating the variations in dynamic range of a tandem variolosser afforded by the apparatus of the invention, e.g., the apparatus of FIG. 1.

FIG. 2 illustrates a typical range of attenuation for various control signal magnitudes. It will be observed that the attenuation range of variable impedance 15 alone may be varied considerably, e.g., from curve A to A′, as a function of the series resistance of the variolosser control circuit (resistors 60 and 61 in FIG. 1). Similarly, variable impedance 17 acting alone may be varied over a wide range, e.g., curve B to B′, by adjustment of the series resistance of its control circuit (resistors 62 and 63 in FIG. 1). The control circuit resistance of variolosser 15 is initially adjusted (by potentiometer 39, and resistors 60 and 61) to establish a characteristic A of loss versus input that provides a fairly smooth increase in loss over a limited range for a wide range of increasing input signals. At the same time, variolosser 17 is initially adjusted (by potentiometer 40 and resistors 62 and 63) to establish a characteristic B of loss versus input that provides an appreciably greater increase in loss over a considerably narrower input range. When connected in series, the over-all characteristic C is the algebraic summation of the two individual curves; it provides sensitive loss control for extremely small values of control current (in the vicinity of the origin of FIG. 2), and somewhat less sensitive, sweeping control, for greater values of control current. As the individual control circuit resistances are changed, the over-all, or composite characteristic, will evidently vary also over a considerable range, e.g., from curve C to curve C′, all the while maintaining its basic nonlinear shape.

In accordance with the present invention, the over-all attenuation range of the two loss elements together is varied continuously and automatically, e.g., within the range indicated by curves C and C′ in FIG. 2, as required, to reduce the range of available suppression during periods of attempted or accomplished double talking. An auxiliary balanced differential circuit is utilized to do this.

Returning now to a consideration of the circuit of FIG. 1, the auxiliary differential circuit typically includes detector circuit 45 energized by signals appearing in the output circuit 12 at point $W_T$, and detector circuit 46 responsive to incoming signals which appear at point $W_R$. Detector 45, which may include an amplifier 47, transformer 48, and bridge rectifier 49, is arranged to exhibit a positive polarity on its output, and detector 46, which may include corresponding elements, namely, amplifier 50, transformer 51, and bridge rectifier circuit 52, is arranged to exhibit a negative polarity. In addition, direct current signals developed by detector 46 are delayed slightly by means of a hangover network, e.g., capacitor 53 shunting the output of detector 46 to ground, in order to compensate for any slight delay in the connecting two-wire loop. The output signals from detectors 45 and 46 are passed by way of resistors 54 and 55, respectively, and added together at point $P_C$ and the resultant serves to actuate trigger circuit 56 each time the speech signal level at point $W_T$ in the outgoing circuit exceeds that at point $W_R$ in the input circuit by a preselected amount. Thus, by virtue of the reverse polarities of the two detectors a signal at point $W_R$ in the input circuit is prevented from actuating trigger circuit 56 regardless of how much its level may momentarily exceed that at $W_T$. However, if the level at $W_T$ exceeds that at $W_R$, control point $P_C$ is driven positive and trigger circuit 56 is actuated whenever the potential at $P_C$ overrides the small negative bias of trigger circuit 56, predetermined by the adjustment of potentiometer 72.

Trigger circuit 56 preferably comprises a two-stage transistor network, although any sort of trigger network may of course be employed. Its output is of sufficient magnitude to actuate relay 57 provided with two independent, normally closed contacts 58 and 59. In the normally closed position the contacts remove resistors 60 and 62, respectively, from the control paths of loss elements 15 and 17, e.g., by placing a short circuit across them. When relay 17 is actuated, both contacts are open and resistors 60 and 62 are placed in the control circuit thus to reduce the maximum suppression range of each of the loss elements. In effect the over-all transfer characteristic of the tandem loss circuit is shifted, during periods of double talking, from curve C of FIG. 2, to curve C′; thus the dynamic range of the suppressor is reduced.

Assume now that speech signals arrive at point $W_R$ from a talker at terminal E and that the subscriber at terminal W remains silent. For this condition the level at $W_R$ always remains higher than the level at $W_T$ by an amount equal to the trans-hybrid loss of hybrid 11. Accordingly, the potential at point $P_C$ remains negative and trigger circuit 56 remains inactive. Hence, the signal which appears on the incoming circuit at point $W_R$ introduces attenuation in variable impedances 15 and 17 in accordance with the characteristic C of FIG. 2 by way of detector 30 and differential network 37. Listening tests show that such a characteristic provides adequate suppression of echo return for all practical purposes.

If speech signals arrive at hybrid 11 of terminal W simultaneously from both subscribers, the level at $W_R$ does not continuously remain higher than that at $W_T$. Because of the fluctuating nature of speech as a function of time, each talker produces momentary levels which exceed the level of the weaker speech signals of the other. This is true even when the over-all levels of the two talkers are not the same. During the momentary intervals when the level at $W_T$ exceeds that at $W_R$, the first stage of trigger circuit 56, e.g., transistor switch 64, is actuated. This, in turn, triggers the second stage transistor 65 which, together with relay 57, is provided with sufficient holdover time to bridge successive intervals for which signals at $W_T$ exceed those at $W_R$. Capacitor 73 may be used for this. Such a condition persists so long as subscriber W's speech remains reasonably continuous, i.e., in the absence of noticeable pauses such as breath intakes, and the like. As a consequence, during periods of double talking the contacts 58 and 59 of relay 57 are held open and resistors 60 and 62 are placed in the control circuit of the loss elements. It is particularly important to note that operation of relay 57 does not remove or disable the variolossers 15 and 17, nor does it merely replace them by an auxiliary low loss attenuator. To the contrary, it effectively reduces the dynamic attenuation range of the lossers, thereby to retain their variable loss action. They continue to function during periods of double talking in response to control signals developed by differential network 37, but over a restricted variable loss range.

Thus, for this condition, that is, for speech signals reaching hybird 11 for both E and W, the weaker speech signals from subscriber E are effective to introduce little or no attenuation in the variolossers 15 and 17 and there is essentially no interference with double talking. On the other hand, the degree of attenuation introduced by stronger speech signals increases with an increasing level of such sounds, but on a restricted basis. Such a retention of the variable loss feature during periods of double talking is preferable to a transfer to a fixed loss on at least four counts. First, it achieves an apparent full volume transmission in both directions since it introduces maximum (restricted) loss only when the peak level would be most apt to mask simultaneous speech signals by the other subscriber. Second, it reduces the amount of noticeable echo return since peak attenuation coincides with otherwise peak return. Third, because of this coincidence, the maximum (restricted) loss can be made larger than an alternate amount of fixed loss. And fourth, it is not necessary to disable subscriber W's control circuit when he alone is talking since W's control circuit acts only to reduce loss in the variolossers, never partially to reintroduce it in outgoing line 12.

It is apparent that there is some overlap in function of the two differentially controlled circuits both of which affect in somewhat different ways the momentary attenuation characteristic of the suppressor elements. Although the two circuits are illustrated individually it will be appreciated that circuit refinements may be made in order to combine the function of several of these elements thus to simplify construction of the terminal apparatus without relinquishing the benefits of the invention. Similarly, in many cases, it has been found that the auxiliary differential circuit, operative to actuate relay 57, provides sufficient differential control of the various impedance elements by incoming signals. In this case, attenuator 31 included in detector 29 may be advanced progressively to remove the degree of control signal supplied to differential network 37. Operation with some differential action by 37, however, yields somewhat smoother and more effective performance than does the system with the other operating alone.

Figure 3:
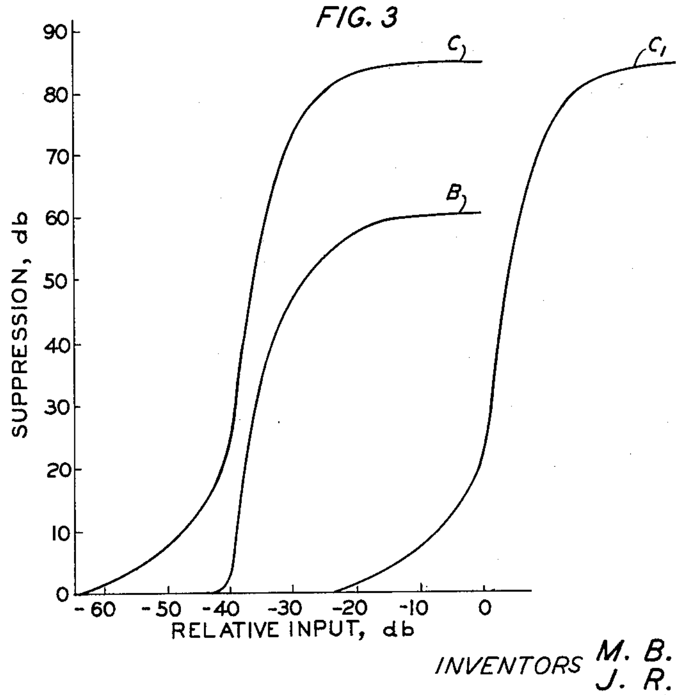
FIG. 3 is a set of curves illustrating the variations in sensitivity of a tandem variolosser achieved with the apparatus of the invention shown in FIG. 1.

Under noise-free conditions adequate suppression and bidirectional transmission is secured by operating with a composite nonlinear loss characteristic C shown in FIG. 3. This corresponds to a composite curve, C through C′, of FIG. 2 and, as described above, varies in dynamic range as a function of the ratio of incoming and outgoing speech signals. In the presence of noise, however, suppressor action of this sort is not completely satisfactory. Accordingly, it is in accordance with the invention to desensitize selectively the suppressor elements as required to maintain satisfactory bidirectional transmission even in the presence of considerable noise. It is possible, of course, merely to remove the first stage variolosser 15 in order to obtain a reduced sensitivity characteristic of the sort shown at B in FIG. 3. It will be observed that with this expedient a somewhat lower maximum loss characteristic obtains as previously for strong control signals, but that the "soft" suppressor action at low control signal levels is eliminated in favor of a "sharp cut-off" characteristic. Yet adequate suppression is provided for echoes since the presence of noise masks any low level echo components that might not now be reduced below a quiet threshold. Exclusive use of the hard switching action afforded by operation with such a characteristic is not desirable, however, on at least two counts. First it introduces switching transients which become rather objectionable under quiet conditions, i.e., the presence of the masking effect of noise. Second, also in the presence of noise it fails to introduce adequate suppression whenever instantaneous speech levels fall below the rather limited sensitivity of curve B of FIG. 3. The latter effect becomes increasingly more noticeable as more and more of the instantaneous speech levels fall below this threshold, a result which occurs with decreasing talking level.

This deficiency is overcome in the present invention by providing for a gradual transition from one characteristic, i.e., a high sensitivity characteristic of the sort shown in curve C of FIG. 3, to the other i.e., a desensitized curve of the sort shown in $C_1$ in which both variolossers have been desensitized, in FIG. 3, when a very high noise level is present. This fully automatic desensitization is accomplished by supplying signals which appear both in outgoing circuit 12 and in incoming circuit 13 by way of isolating amplifiers 66 and 69 and potentiometers 33 and 36, respectively, to nogad circuits 67 and 70. By virtue of the potentiometers, 33 and 36, the relative sensitivities of these circuits may be controlled independently. Nogad circuits 67 and 70, which preferably are of the sort described in United States Patent 1,814,018 of S. B. Wright and D. Mitchell, but which may be of any other desired construction, are virtually insensitive to voice frequency signals because of their slow build up-quick release characteristic. They respond to steady noise, however, and my means of a rectifier or the like develop a D.-C. potential proportional to the noise level. The control signal developed by nogad 67 is supplied to variolosser 68 connected serially between amplifier 41 and rectifier 43 in the control path of variable impedance 15. The output signal developed by nogad 70 is supplied to variolosser 71 connected between amplifier 42 and rectifier 44 in the control path of variable impedance 17. As the noise level increases in either the incoming or the outgoing circuit, variolossers 68 and 71 are independently adjusted to place more loss in the control circuits of the variable impedances thereby to reduce their sensitivities. Ordinarily, a considerable loss is introduced in the control path of losser 15 in order to desensitize the circuit at low input levels, and only a slight degree of loss is introduced in the control path of losser 17, as required to desensitize the curve further to obtain any desired characteristic. It has been found that a reduction in the sensitivity of variable impedance 17 only, after a complete desensitization of impedance 15, is quite satisfactory. Although independent nogad control of the variolossers is each control circuit is shown by way of example, it is, of course, possible to employ a single nogad device to operate both variolossers and to provide the necessary adjustment in the control sensitivity in the variolosser device themselves.

Although the noise desensitizing aspect of the invention has been discussed independently and illustrated by way of the curves on FIG. 3, it is to be understood, of course, that even as the characteristic curve of FIG. 3 is altered in sensitivity (indicated by a shift in the over-all curve to the right in the drawing), its dynamic range is simultaneously controlled in dependence on the speech signal magnitudes in the incoming and outgoing circuits as discussed hereinabove. In effect, alterations in dynamic range shift the curve vertically on the scale of FIG. 3, while variations in the noise level of the circuit shift it laterally.

The above-described arrangements are merely illustrative of the application of the principles of the invention. Numerous other arrangements may be devised by those skilled in the art without departing from the spirit and scope of the invention.

What is claimed is:

1. A system for suppressing echoes in a two-way signaling circuit including incoming and outgoing one-way paths, comprising, adjustable means for altering the transmission efficiency of said outgoing one-way path, first means for differentially responding to the amplitude of signals in both of said one-way paths, means responsive to said first differential response for establishing the dynamic range through which said adjustable means is operative, second means for differentially responding to the amplitude of signals in both of said one-way paths, means responsive to said second differential response for smoothly altering the transmission efficiency of said outgoing path within said pre-established dynamic range, means connected to said one-way paths for responding to the noise level in said two-way circuit, and means responsive to said noise response for adjusting the sensitivity of said adjustable means.

2. A system for suppressing echoes in a two-way signaling circuit including incoming and outgoing one-way paths, comprising, adjustable means for altering the transmission efficiency of said outgoing one-way path, means for differentially responding to the amplitude of signals in both of said one-way paths, means responsive to said differential response for establishing the dynamic range through which said adjustable means is operative, means responsive to the magnitude of signals in said incoming one-way path for altering the transmission efficiency of said outgoing path within said pre-established dynamic range, means connected to said one-way paths for responding to the noise level in said two-way circuit, and means responsive to said noise response for adjusting the sensitivity of said adjustable means.

3. A system for suppressing echoes in a two-way signaling circuit including incoming and outgoing one-way paths, comprising, first and second adjustable means for independently altering the transmission efficiency of said outgoing one-way path, first means for differentially responding to the amplitude of signals in both of said one-way paths, means responsive to said first differential response for independently establishing the dynamic range through which each of said adjustable means is operative, second means for differentially responding to the amplitude of signals in both of said one-way paths, means responsive to said second differential response for smoothly altering the transmission efficiency of each of said adjustable means in said outgoing path within the pre-established dynamic range of each, means connected to said one-way paths for responding to the noise level in said two-way circuit, and means responsive to said noise response for independently adjusting the sensitivity of each of said adjustable means.

4. The system for suppressing echoes as defined in claim 3 wherein said first and said second adjustable means for independently altering the transmission efficiency of said outgoing one-way path comprise first and second vario-lossers connected in tandem in said outgoing one-way path, the impedance of said first and said second variolossers being dependent upon the magnitude of an applied direct current control signal, wherein said means for establishing the dynamic range of said adjustable means comprises first and second adjustable impedance means connected in the direct current control circuits of each of said first and said second variolossers, and wherein said means for adjusting the sensitivity of each of said adjustable means comprises third and fourth variolossers connected in circuit relation with the control circuit of said first and said second variolossers.

5. In a system for suppressing echoes in a two-way signaling circuit comprising incoming and outgoing one-way paths, first and second adjustable loss means serially connected in said outgoing one-way path, means responsive to the amplitudes of speech signals in at least one of said one-way paths for continuously adjusting said first and said second loss means, means for differentially responding to the amplitude of signals in both of said one-way paths, means responsive to said differential response for separately adjusting the dynamic range of said first and second loss means, means for providing a measure of the noise level in each of said paths, and means responsive to said measure of noise level for separately adjusting the sensitivity of said first and said second loss means.

6. Apparatus for suppressing echoes in a two-way signaling circuit including incoming and outgoing one-way paths, which comprises, in combination, a first variolosser, an amplifier, and a second variolosser serially connected in said outgoing one-way path, first and second control circuits for independently adjusting the momentary loss characteristic of said first and said second variolossers, respectively, each of said control circuits including the tandem arrangement of a variolosser, a rectifier, a first resistor, and a second resistor, said second resistors being connected, respectively, to the control input points of said first and said second variolossers in said outgoing one-way path, means for supplying signals present in said incoming one-way path to the input terminal of each of said control circuit variolossers for continuously adjusting the loss characteristics of said first and said second variolossers, means differentially responsive to the amplitude of signals in both of said one-way paths for producing differential control signals, means responsive to said differential control signals for separately adjusting the resistance of said first resistors in each of said control circuits, thereby to alter the range through which said first and said second variolossers may be adjusted by signals in said incoming one-way path, means for developing a control signal whose momentary magnitude is proportional to the noise level in each of said one-way paths, and means for supplying said last-mentioned control signal independently to said first and second control circuit variolossers whereby the effectiveness of said signals from said one-way path in controlling the loss characteristic of said first and said second variolossers in said outgoing path is adjusted as a function of circuit noise.

7. Apparatus for suppressing echoes as defined in claim 6 wherein said means for separately adjusting the resistance of said first resistors in each of said control circuits comprises a trigger circuit responsive to said differential control signals of preselected polarity and magnitude for developing an output signal, and switching means associated with said first resistors in each of said first and second control circuits for altering the magnitude of said first resistors in response to said trigger circuit output signals.

References Cited in the file of this patent

UNITED STATES PATENTS 2,352,081 Davis ---------------- June 20, 1944
2,632,052 Garfield ---------------- Mar. 17, 1953
3,028,489 Chasek ---------------- Apr. 3, 1963